United States Patent [19]
Hanko et al.

[11] Patent Number: 5,852,705
[45] Date of Patent: Dec. 22, 1998

[54] METHOD AND APPARATUS FOR GUARANTEEING AVERAGE CASE DISK TRANSFER BANDWIDTH AND SEEK TIME FOR A VIDEO SERVER

[75] Inventors: James G. Hanko, Redwood City; Steve Kleiman, Los Altos, both of Calif.

[73] Assignee: Sun Microsytems, Inc., Mountain View, Calif.

[21] Appl. No.: 446,144

[22] Filed: May 22, 1995

[51] Int. Cl.$^6$ ............................... H04N 5/91; H04N 7/08
[52] U.S. Cl. ................................. 386/92; 386/83
[58] Field of Search .................... 358/335, 342; 348/7, 6.1, 8; 360/32, 33.1; 386/46, 83, 92, 106, 125, 126, 127, 1; H04N 5/91, 7/08

[56] References Cited

U.S. PATENT DOCUMENTS

| | | | |
|---|---|---|---|
| 5,341,474 | 8/1994 | Gelman et al. | 395/200 |
| 5,510,905 | 4/1996 | Birk | 358/342 |
| 5,530,557 | 6/1996 | Asit et al. | 358/342 |

OTHER PUBLICATIONS

Streaming RAID™—ADisk Array Management System for Video Files by F.A. Tobagi, et al. (1993 ?), Starlight Networks, Inc., Mountain View, CA 94041.

*Primary Examiner*—Robert Chevalier
*Attorney, Agent, or Firm*—Flehr Hohbach Test Albritton & Herbert LLP

[57] ABSTRACT

In a video server hard disk storage unit, video layout ensures average case bandwidth and case seek time during bounded-time information transfers, to maximize access of users S. The storage unit includes D hard disks whose platters are divided into Z zones. Each movie is divided into i blocks and is striped across all D disks such that movie block i is stored on disk (i mod D). In one embodiment, movie block i is placed in zone (i/D) mod Z of disk (i mod D). User streams are organized into slots containing N=S/D streams and the number of streams in each slot accessing a zone is $\leq$(N/Z). Seeking is to the nearest end of a set of accesses, where total seek time for a set of N accesses is $\leq$N*seek (1.5/N). Preferably two storage buffers/stream are used. Admission policy permits stream assignment to any slot, but streams do not transfer until the needed data block is on the disk needed by the other streams in the slot, and until the block is in the proper disk zone. A second embodiment optimizes disk seeks by placing movie block i in zone (((i/D)+(i mod D)) mod Z) of disk (i mod D) to reduce buffer unit requirements. The S streams progress in order 0 to S−1 through disks 0 to D−1, all streams accessing each disk from the same zone before moving through the disk in another zone.

27 Claims, 2 Drawing Sheets

METHOD AND APPARATUS FOR GUARANTEEING AVERAGE CASE DISK TRANSFER BANDWIDTH AND SEEK TIME FOR A VIDEO SERVER

FIELD OF THE INVENTION

The present invention relates generally to video storage systems used with video servers, and more specifically to methods and apparatuses for promoting average case bandwidth and average case seek time for such video storage systems.

BACKGROUND OF THE INVENTION

Video servers, including networked video servers, are known in the art. At the transmitting end, video servers include a library of video sources, e.g., movies from video, and permit one or more users to select one or more of the movies for viewing. An admission arbitrator unit is provided to limit the number of users allowed to use the video server at any given time, to prevent overloading the network or disk storage system. Such overload could cause movies to run too slowly or to move forward (or backward) in a jerky motion.

The video server includes magnetic storage hard disk drives on which recorded blocks from the user-selected video source are magnetically stored. Movies typically are two hours long, and are encoded at a rate between perhaps 1 Mb/second and about 8 Mb/second. Thus, one movie may require 1 GB to 8 GB of storage media.

However, it is impractical to store an entire movie in a hard disk unit because a typical hard disk drive can only output data at the rate of a few MBytes/second. To circumvent this storage problem, it is common to store blocks of the movie (e.g., perhaps 0.5 second sequences) in the hard disk units. These blocks are then read-out or transferred to a buffer, and communicated over the network. As these blocks are sent over the network, new blocks from the movie are read-out from the hard disk unit. At the receiving end, the blocks are decoded for user viewing on a video monitor, television receiver or the like.

The use of hard disk drives to store information magnetically is well known in the art. A single hard disk drive typically includes several rotating disks or platters upon whose surfaces information may be written or read by a read/write head. Within a hard disk drive, the platters rotate together, and all read/write heads typically are moved simultaneously to access different platter positions. A platter typically is formatted into concentric tracks that define collectively, platter-to-platter, a family of concentric cylinders, and into sectors that represent a portion of a track. A controller associated with the hard disk unit determines which cylinder, read/write head and sector is to be accessed for reading or writing.

The platters may also be considered as being divided into zones. Because they are physically larger, tracks in zones at the outer platter perimeter contain more sectors than tracks in zones nearer the rotational axis of the platter. Therefore, assuming that the platters rotate with a constant velocity $\omega$, the data bandwidth available from the outermost zones is greater than the data bandwidth available from the innermost zones. Even with modern hard disk drives, there can be a 2:1 variation between worst case and average case disk transfer bandwidth, due to sectors/track variations between outer and inner zones.

Delays ("seek time delay") occur in repositioning the heads in seeking out a target platter area for reading or writing data, due to the platter rotation and the mechanical positioning of the read/write heads. The seek time, e.g., how long it takes for the read/write heads to relocate to a desired target area, has three components. There is an acceleration time component that is essentially constant for long distance seeks, and diminishes somewhat for shorter seeks since full head acceleration is not needed. After acceleration, there is a constant velocity motion component, and upon reaching the target area, there is a deceleration component that may be considered constant for long seeks and is less for shorter seeks.

For suitably long seeks, the constant velocity motion component predominates, and the acceleration/deceleration components may be regarded as fixed overhead. Very short seeks would be faster because full acceleration would not be required. As shown by the following equation (in which seek(x) is the time to seek x faction of the disk), worst case seek time for a set of seeks over some distance occurs when the seeks are all of equal distance:

$$\text{seek}(X_1) + \text{seek}(X_2) + \ldots + \text{seek}(X_n) \leq n \cdot \text{seek}\Sigma \frac{|X_i|}{n}$$

Understandably, the worst case seek time is when the read/write heads are required to traverse the full platter, e.g., from an outermost zone to an innermost zone, or vice versa. Hard disk drives are often specified in terms of an average seek time that represents the delay time to seek across approximately 33% of the platter. Even a modern hard disk unit can exhibit a 2:1 variation between worst case and average case seek times.

It is known in the prior art to attempt to optimize seek time on video storage units within video servers. One prior art approach dedicates one hard disk drive within the video server to one video source. Thus, if a user selects a movie for viewing (and if the admission arbitrator so permits), blocks from the selected movie are stored magnetically onto one hard disk drive, which is then read-out through a buffer for user viewing. If several viewers are watching the same movie, a so-called "elevator sort" procedure is applied over the disk requests for all of the viewers. This procedure can be used to achieve disk seek times approaching the disk unit average seek time.

Unfortunately, such disk-dedicated systems can only accommodate perhaps four asynchronous users simultaneously due to the inability of a hard disk drive to stream out recorded data faster than a few MBytes/second. It must be appreciated, however, that not all users may chose to start viewing the movie at the same time. Further, some users may wish to fast-forward certain segments, or to go back and review certain segments. Thus, while seek time can be improved by storing one movie in one hard disk unit, the resultant system is impractical if a large number of users must be served. Further, disk-dedicated systems do not attempt to improve upon hard disk bandwidth, which must be assumed to be the worst case bandwidth.

It is also known in the prior art to store a portion of a given movie across each of a plurality of hard disk drives, a process known as "striping data". However, such techniques store in the same location across each hard disk drive such that one movie block is stored in a location on the first disk, the next movie block is stored in the identical location on the second disk, the next movie block is stored in the same location on the third disk, and so on. When the last disk is reached, the next movie block is stored on the first disk, and the process is repeated ad infinitum.

This technique spreads user loads evenly among the disks over which the movie is striped, and can allow additional users to view a single movie, without having to store redundant copies of the movie. By performing an elevator sort procedure over multiple disk requests, improved disk seek times may be achieved, approaching the average seek time. However, like other prior art techniques, this approach does not address the variation in hard disk bandwidth, which must be assumed to be the worst case value.

To summarize, prior art video server systems at best try to optimize hard disk seek time, but are limited by the transfer bandwidth of the hard disk drives used in the system. The result is a limitation on the number of users that will be permitted access to the system at a given time. Stated differently, for a given number of users to whom access is to be permitted, prior art video systems require a substantial hardware investment for multiple large capacity hard disk drive units.

Thus, there is a need for a video server system in which video is stored so as to guarantee at least an average case hard disk unit transfer bandwidth as well as an average case seek time. Such storage would permit a greater number of asynchronous users to gain access to the system at any time than would a prior art system comprising approximately the same storage hardware.

The present invention discloses such a video server system.

SUMMARY OF THE INVENTION

In a video server system, the number of supportable information streams (or users) is a function of the speed characteristics of the storage media and of the bandwidth required for each stream. The present invention lays out video information on magnetic storage media in a video server such that an average case bandwidth and average case seek time are essentially or approximately achieved during information transfers, at least over a bounded time interval. Achieving these system parameters maximizes the number of information streams that may access the stored video.

In a first embodiment, the video server includes a hard disk unit comprising a number (D) of hard disks having multiple storage platters, each platter being divided into Z zones. Each video movie is divided into a number (i) blocks of a preferably fixed time interval, e.g., 0.5 second, and is striped across all D disks such that movie, block i is stored on disk (i mod D). Block location on the disks is such that block i of a movie is placed in zone (i/D) mod Z of disk (i mod D).

The streams are organized into slots that each contain N=S/D streams, where S is the total number of streams that may be accommodated. This ensures that the number of streams in a slot using each zone is approximately equal, such that the number of streams in each slot accessing any given zone is no more than a ceiling (N/Z). Streams in each slot proceed in lock-step from disk to disk. Seek order is optimized by seeking to the nearest end of a set of accesses, where total seek time for a set of N accesses is $\leq N^*$seek (1.5/N) during the initial pass, and (1/N) during subsequent passes. Because each slot contains roughly equal numbers of elements from each zone, and worst case bandwidth for each slot may be calculated. Worst case bandwidth for a slot will exceed the hard disks' worse case and in practice may approach the disks' average case bandwidth.

Preferably the server buffer system includes two buffers per stream, one buffer receiving video information from the disks, while the other buffer outputs video information to the network. Admission policy recognizes that stream may be assigned to any slot, but must not transfer from disk until the needed data block is on the disk needed by the other streams in the slot, and until the block is in the proper disk zone.

A second embodiment provides a more predictable timeline that minimizes the buffer unit requirements, but at the cost of less optimal seek times relative to the first embodiment. As in the first embodiment, the hard disk unit includes D hard disks that each have multiple storage platters, each of which is divided into Z zones, with each video movie again being divided into i blocks of a preferably fixed time interval and being striped across all D disks such that movie, block i is stored on disk (i mod D). Block i of a movie is placed in zone (((i/D)+(i mod D)) mod Z) of disk (i mod D). The S streams progress in order 0 to S−1 through disks 0 to D−1, all streams accessing each disk from the same zone before moving through the disk in another zone.

Average seek time for Z=2 and large S will be less than the hard disk worst case seek, but not be as good as the average case seek. Ignoring the D−1 to 0 case, each stream will traverse each zone in turn, and the average of the worse case bandwidth and the best case bandwidth for each zone may be realized. The streams will be approximately uniformly distributed through consuming their buffers at any given time. Because streams access the disks in pipeline order without disk contention, a stream can delay issuing a next read until the data remaining in the play-out buffer is sent in the time it takes for a worst-case seek and transfer time. Admission policy uses bandwidth and seek time calculations to determine a bound on the maximum number of streams that are guaranteed to be supported.

Other features and advantages of the invention will appear from the following description in which the preferred embodiments have been set forth in detail, in conjunction with the accompanying drawings.

DETAILED DESCRIPTION OF THE PREFERRED EMBODIMENTS

Figure 1:
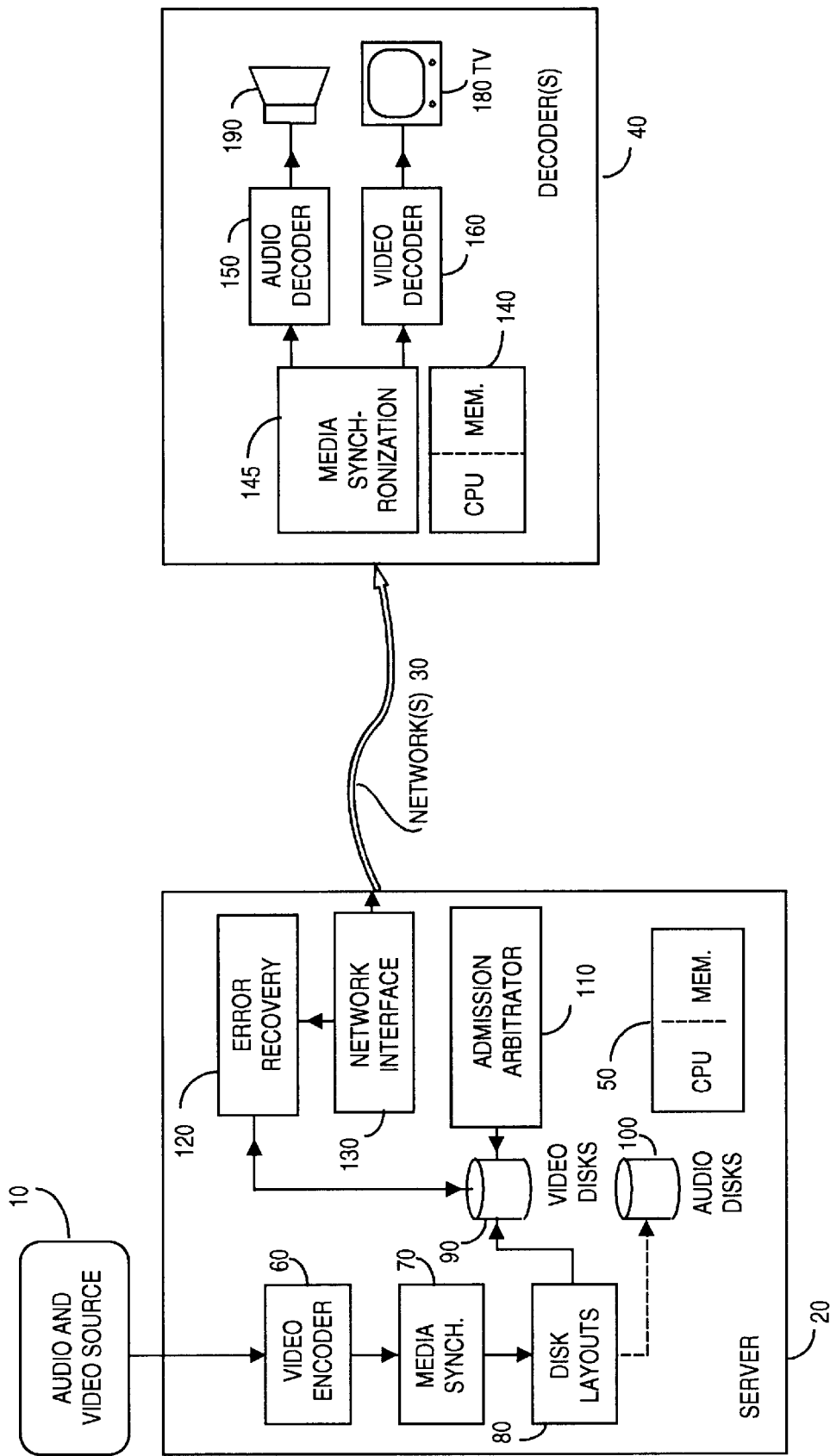
FIG. 1 depicts a network for distributing video, in which the network server stores video information according to the present invention.

FIG. 1 depicts a video delivery system in which video is arranged for storage according to the present invention. A source of audio and video information 10 is coupled to a server or encoder system 20 whose processed output is coupled over one or more networks 30 to one or more target clients or decoder systems 40. The network may be homogeneous with network transmission occurring through a so-called network cloud that multicasts the encoded information stream, or transmission may be point-to-point. If heterogeneous, the networks can have widely varying bandwidth characteristics, ranging from as low as perhaps 10 Kbps for telephones, to 100 Mbps or more for ATM networks.

Server 20 includes a central processor unit ("CPU") with associated memory, collectively 50, a video encoder 60, and a mechanism 70 for synchronizing audio, video and text information. Server 20 further includes the present invention, a system 80 for arranging the information processed by the encoder 60 onto video storage disk unit 90 (or other storage media). Storage 100 is also provided for signal processed audio information. The present invention may also be practiced in systems wherein video and audio information are stored in a common storage disk unit 90, using interleaving techniques, for example. In such systems, the separate storage unit 100 depicted in FIG. 1 is omitted.

An admission control mechanism 110 and a communication error recovery mechanism 120 for handling bit errors or packet cell loss are also coupled to the processed video storage 90. The server communicates with the heterogeneous network(s) through a network interface 130.

At the receiving end, decoder systems(s) 40 include a central processing unit ("CPU") 140 that includes a CPU per se and associated memory that may include cache memory. Decoder(s) 40 further includes a mechanism 145 for synchronizing audio and video information from the incoming embedded stream, as well as audio and video decoders 150, 160. The output from these decoders is coupled to sound generators, e.g., speakers 190, and to video displays, depicted as TV 180.

The system shown in FIG. 1 may be used in many applications. For example, a hotel may provide video on demand to a plurality of hotel rooms for guest viewing, or a cable company may provide video on demand to a plurality of subscribers.

If desired, the present invention 80 may be practiced with an end-to-end scalable video system that uses a scalable video encoder. Such a video encoder is disclosed in U.S. patent application Ser. No. 08/423,812 filed Apr. 18, 1995, entitled SOFTWARE-BASED ENCODER FOR A SOFTWARE-IMPLEMENTED END-TO-END SCALABLE VIDEO DELIVERY SYSTEM, and assigned to the assignee herein. A video decoder for decoding a scalably encoded video stream is disclosed in U.S. patent application Ser. No. 08/424,703, filed Apr. 18, 1995, entitled DECODER FOR A SOFTWARE-IMPLEMENTED END-TO-END SCALABLE VIDEO DELIVERY SYSTEM, and assigned to the assignee herein. Of course, the present invention may also be practiced with more conventional video display systems. If desired, the present invention may also employ a video disk system 90 and error recovery system 120 as disclosed in U.S. patent application Ser. No. 08/445,820, filed May 22, 1995, entitled SERVER DISK ERROR RECOVERY SYSTEM, and assigned to the assignee herein.

The number (U) of active users permitted to access video transmitted over the network is constrained by the number of active data streams supported by each hard disk unit, and the layout of the stream data over the platters within the hard disk units. In turn, the number of streams (S) supported by each hard disk unit is constrained by the byte size of the disk transfers, by the disk bandwidth during disk transfers, and by the seek time between disk transfers. It will be appreciated that while increasing the storage capacity of the hard disk unit will permit a greater number of movies to be stored, such increase will not allow the video system to support more simultaneously delivered streams.

Hard disk overhead is minimized with longer transfers. Thus the present invention preferably uses a relatively large yet reasonable transfer size of approximately 256 KBytes, which block size contains approximately 0.5 seconds of data as consumed by the viewer client. Of course, other block sizes and transfer rates could instead be used. As noted, a 2:1 variation can exist between worst case and average case for both seek times and disk transfer bandwidth. If worst case bandwidth or seek times were permitted to exist over an unbounded period, the number of supported streams would have to be constrained by these worse case values.

Accordingly, the present invention maximizes the number of supported streams (S) by achieving, at least over a small bounded interval of time, essentially or approximately average case hard disk bandwidth and seek times. By "essentially or approximately" achieved it is meant that a performance figure better than a midpoint between the absolute worst case hard disk bandwidth and the overall average hard disk bandwidth is certain to be achieved. Further, by "essentially or approximately" it is also meant that as long as there are at least five streams/disk, at least average case seek time is achieved. The result is that these average case values may be used to calculate the number of supported streams, a number that will exceed the supported streams using worst case numbers, regardless of whether the admission arbitration is stochiastic or deterministic.

Figure 2:
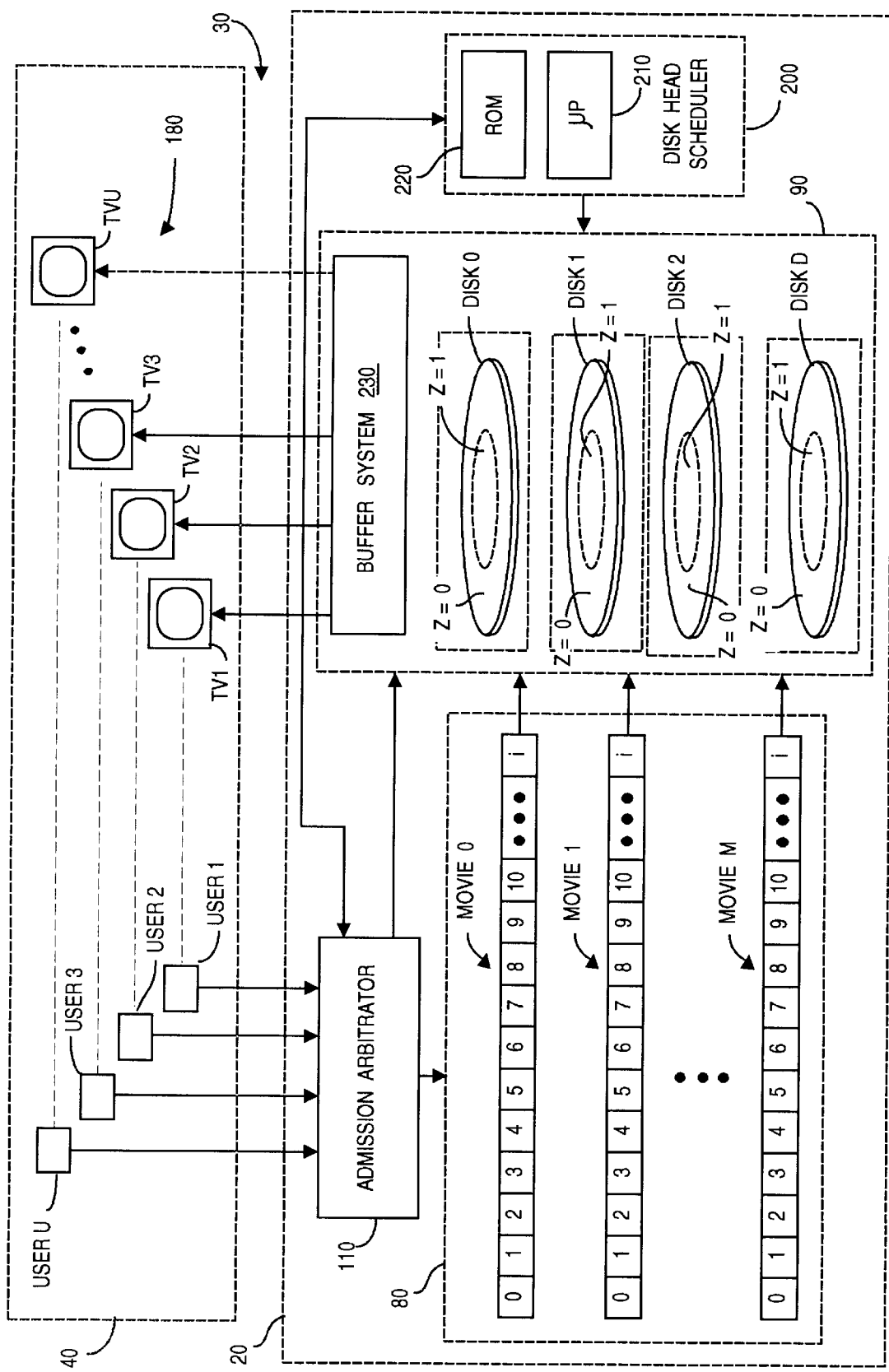
FIG. 2 depicts a video display system whose server system stores video information according to the present invention.

FIG. 2 provides further detail as to the disk layout unit 80, video storage unit 90, and disk head scheduler unit 200 components of the server 20. In practice, video storage unit 90 will include a plurality D of hard disk units, shown here as DISK 0, DISK 1, . . . DISK D. Although for ease of illustration each hard disk unit is depicted as having but a single storage disk, in practice each unit comprises a plurality of storage disks. FIG. 2 depicts a general case wherein there are a plurality of users, denoted USER 1 through USER U, watching U different movies on monitors TV1 through TVU. Of course, several users could watch the same movie on different monitors, typically asynchronously. The disk layout mechanism 80 is shown processing a plurality of movies, denoted MOVIE 0 through MOVIE M, wherein each movie comprises a plurality of block 0, 1, 2 . . . i.

According to the present invention, mechanism 80 lays out video information from MOVIES 0 through i on the hard disk unit 90 in server 20 such that an average case bandwidth and average case seek time are ensured during information transfers, at least over a bounded time interval. This assurance maximizes the number U of users (or streams) permitted to access the video server at any given time. Alternatively, for a fixed number U, the present invention allows up to a number U users to access a server system implemented with less expensive hardware than prior art systems. Applicants estimate that for a given number of users U, either embodiment of the present invention may be implemented for perhaps 50% to 70% of the cost of a prior system equipped to handle U users. Alternatively, for a system implemented for a given dollar cost, the present invention is estimated to accommodate 33% to 100% more users than a prior art system implemented for the same dollar cost.

In each of the preferred embodiments, the video server includes a hard disk unit comprising a number (D) of platters, each platter being divided into Z zones. Each video movie is divided into a number (i) blocks of a preferably fixed time interval, e.g., 0.5 second, and is striped across all D disks such that movie, block i is stored on disk (i mod D).

By "i mod D" it is meant that if there are D=30 hard disks within unit 90, for a given movie the first block is stored on the first hard disk (DISK 0), the second block is stored on the second hard disk (DISK 1) . . . the 30th block is stored on the 30th hard disk (DISK D), the 31st block is stored on the first hard disk (DISK 0), and so on. In the preferred embodiment, block size is perhaps 200 KByte and the transfer stream rate is about 0.5 MByte/second, although other values could instead be used. Thus, for a given movie, some video will be transferred off of each hard disk unit within storage unit 90.

The above-described layout is for ease of implementation. It will be appreciated that where (L) is a movie's length in blocks, all movies will start on DISK 0, but will end at DISK L mod D. Thus, the first disks will always be filled with movies, but the last disk, DISK D, will be fragmented in that on average, only L of D movies would place their last block on the last disk, DISK D. To avoid such fragmentation, one could start each movie on any one of the D disks. Thus, if the movies started on a disk d, all block numbers in the computation would be i=(d+Mi), where Mi represents movie block i. The first d blocks in the stream are imaginary and would be unreferenced at movie startup. Randomly selecting the starting disk for each movie would make better use of the storage capability of storage unit 90, permitting a greater number of movies to be stored.

In a first embodiment, hard disk seek time is optimized, but at the cost of additional buffer memory. In this embodiment, the location of the movie blocks on the hard disks is such that block i of a movie is placed in zone (i/D) mod Z of disk (i mod D). Thus, for Z=3 zones, and D=5 disks, the <disk,zone> layout for the first embodiment wou8ld be:

$$\begin{array}{ccccc}
<0,0> & <1,0> & <2,0> & <3,0> & <4,0> \\
<0,1> & <1,1> & <2,1> & <3,1> & <4,1> \\
<0,2> & <1,2> & <2,2> & <3,2> & <4,2> \\
<0.0> & <1,0> & \ldots & &
\end{array}$$

The total number of asynchronous streams that may be accommodated by server 20 at one time is S. These S streams are organized into "slots" that contain N=S/D streams. The number of streams in a slot using each zone is approximately equal, and the number of streams in each slot accessing any given zone is bounded by a ceiling (N/Z).

Within a period of time, data is read for all of the streams organized into each slot, but the order in which the disks are read is determined by optimizing disk seeks. The timeline in this first embodiment is somewhat unpredictable in that the first stream in a slot may not necessarily be the first to have its data read.

The streams in each slot proceed in lock-step from disk to disk. A group is a set of streams balanced in their use of a zone such that average case seek time is assured. Consider the case of a set of N ordered seeks, and a seek algorithm stored, for example, in ROM or other memory 220 is disk head scheduler 200 shown in FIG. 2. Such algorithm should seek to the nearest end of the set and then proceed through the set to the nearest subsequent position. Expressed as a fraction of the disk, worst case total seek distance for the set would be:

total seek distance $\leq 0.5+(N-1)*1/(N-1)$ total seek distance $\leq 1.5$

Consider the case where N=1, in which case worst case seek is over the entire disk:

total seek $\leq 1$

For the case where N>1, and the starting disk position is in the middle of the group, one seek of at most 0.5 disk will be required to get to the nearest end of the group from a current read head position. Thereafter, there will be (N−1) seeks of average $\leq 1/(N-1)$ of the disk. Stated differently, worst case seek occurs when the starting position is in the middle of the disk, and the set of seeks spans the disk:

total seek $\leq 0.5+(N-1)*1/(N-1)=1.5$

Consider now the case where N>1 and the starting position is outside the group. There will now be N seeks of no more than 1/N of the disk average. Thus:

total seek $\leq N*(1/N)=1$

Therefore, total seek time for the set of N accesses is $\leq N*\text{seek}(1.5/N)$, and:

average seek $\leq \text{seek}(1.5/N)$

If the number of streams in each slot N is $\geq 5$, then average seek time over each slot will be less than the hard disk quoted average seek time, e.g.:

$\text{seek}(1.5/N) < \text{seek}(1/3)$

Because each slot contains roughly equal numbers of elements from each zone, worst case bandwidth for each slot may be calculated. The number of elements in a worst case zone is bounded by a ceiling (N/Z), and the best zone will have at least (N/Z) elements, and similarly for other zones, if any. Thus, given worst case bandwidth for transfers from each zone, the worst case bandwidth for each slot may be calculated. The worst case bandwidth will be better than the hard disks' worst case and in practice may approach the disks' average case bandwidth.

With reference to FIG. 2, the simplest method of buffering in the first embodiment would be to provide a buffer system 230 that includes at least first and second buffers per stream. A first buffer would play-out data while the second buffer was being filled with data from the hard disks. Thus, two buffers, preferably fast dynamic random access memory ("DRAM"), will suffice to meet the constraints of time to ensure that video is smoothly transferred, as perceived by the user. Thus, for a buffer system 230 of, say, 256 KByte storage, play-out of 256 KByte would occur evenly over about 0.5 seconds.

If desired, however, a more complex buffer system 230 could instead provide approximately one buffer per stream and an additional buffer per disk. In such a scheme, buffer system 230 would be implemented as a plurality of storage segments that were managed separately. At the beginning of each period, each stream in a slot would have a full buffer of data, and there would be an empty buffer into which the first disk transfer could be made. During a transfer time period, each stream would free up segments containing already transferred data, and the thus freed buffer segments would be available to receive subsequent disk transfers. Note that extra buffer segments would be required unless the number of segments per buffer was equal to the number of streams per slot. In a worst case scenario, the buffer segments would be ready in time for disk transfers, and if hard disk performance exceeded worst case, the disk transfer process would be deferred until sufficient buffer segments were available to receive data.

The admission arbitrator 110 shown in FIG. 2 determines, at a minimum, whether the video system can accommodate an additional user (or users), and if so, into which group of streams admission should occur. The capacity and performance characteristics of each hard disk drive are known, and a model of each drive's capacity can be created. However, since each stream touches each drive, and each drive is identical, a group of streams moving together can be examined to see if admitting an additional user would, at any one time, overload the first hard disk drive. (Since if the first hard disk drive will not be overloaded, not of the drives would be overloaded.)

Applicants' admission policy recognizes that a user (or stream) may be assigned to any slot, but that movie data must not transfer from hard disk until the needed data block is on the disk needed by the other streams in the slot, and until the block is in the proper disk zone. The worst case number of supportable streams per slot (s) may be calculated using the known hard disk characteristics including the assured (at least over a bounded time) average case bandwidth and seek time information. The worst case time needed to obtain the first block of data will be $D*Z*t$, where t is the time needed to play-out one buffer in buffer system 130.

Assume that hard disk unit 90 is implemented using Hewlett Packard model C2240 hard disks. These disks rotate at about 5400 RPM, have a track-to-track seek time of about 2.5 ms, a rotation of about 11.2 ms, read/write head switching of <1 ms. Eight regions were used of 533, 192, 136, 144, 138, 318, 268 and 252 cylinders that, respectively, contained 96, 92, 88, 84, 80, 72, 64 and 56 sectors. Seek(X)=4.75+ 17.25*X ms for long seeks. For shorter seeks, less time is required, with average seek time being about 10.5 ms and worst case seek time being about 22 ms.

If Z=2 zones are used according to the present invention, the worst case for the fast and slow zones are 88 sectors and 56 sectors, respectively. For 256 KByte buffers, the buffer transfer is 5.8 disk revolutions in the fast zone, and 9.1 revolutions in the slow zone. Note that this implies that optimizing bandwidth is more important than optimizing seeks, because the difference in transfer times is 56 ms, whereas the difference in seek times is 12 ms.

Assuming that data plays-out from the buffer system at a fixed, say, 4 Mbit/second rate for each stream, then the contents of one buffer are transferred out in 0.5 second, which establishes the disk read interval.

For the above-described first embodiment, the buffer access time calculation is as follows: seek(1.5/N)+seek 11.2/2+disk rotational latency+floor (N/2)/N*(5.8*11.2+fast zone transfer 2.5+5*1)+track switching ceiling (N/2)/N* (9.1*11.2+slow zone transfer 2.5+9*1)+track switching time.

The subject calculations are based on information on disk characteristics published in "Streaming RAID—A Disk Array Management System for Video Files", by F. A. Tobagi, et al., Starlite Networks 1993.

Table 1 summarizes these results, showing buffer access time and percentage of the time the hard disks are busy, as a function of number of streams/disk N. As shown in Table 1, N=(500 ms/109.8 ms) or N=4.5 streams can be served per disk without overload occurring.

TABLE 1

| N | Access Time (ms) | Disk Busy (%) |
|---|---|---|
| 1 | 149.6 | 29.9 |
| 2 | 116.2 | 46.5 |
| 3 | 118.7 | 71.2 |
| 4 | 109.8 | 87.8 |
| 5 | 112.6 | 112.6 |

If 7200 RPM disks are assumed, with all other characteristics remaining identical, the results will be as shown in Table 2. These results are indicative of the capacity of the latest generation of hard disks, which rotate at 7200 RPM.

TABLE 2

| N | Access Time (ms) | Disk Busy (%) |
|---|---|---|
| 1 | 118.9 | 23.8 |
| 2 | 90.8 | 36.3 |
| 3 | 91.5 | 54.9 |
| 4 | 84.3 | 67.5 |
| 5 | 86.1 | 86.1 |
| 6 | 82.2 | 98.6 |

It is apparent from Table 2, that a maximum of N=(500 ms/82.2 ms) or N=6.1 streams/disk can be served by each disk. Assume now a system using worst-case seek and worst case bandwidth disk transfer characteristics. Such a system has been widely described in the prior art and is commonly used. Buffer access time will be: 22+seek 11/2/2+rotational latency (9.1*11.2+slow zone transfer 2.5+9*1)+track switching time=141 ms, or about 3.5 ms/disk. For 7200 RPM disks, the buffer access time will be 110.3 ms, or about 4.5 streams per disk. Stated differently, the present invention can supply 35% more streams per disk than can this prior art method on such disks.

A second embodiment optimizes disk seeks by a lesser amount by providing a more predictable timeline that minimizes the buffer unit requirements. As in the first embodiment, the hard disk unit includes D multi-platter hard disk drives, each of which is divided into Z zones. Again, each video movie is divided into i blocks of a preferably fixed time interval and is striped across all D disks such that movie, block i is stored on disk (i mod D). As described below, the streams are laid out in order in memory, are read into and are played-out of buffer in order.

In this embodiment, a movie's blocks advance through the various zones in turn in pipeline fashion during each group of D blocks, such that block i of each movie is in zone (((i/D)+(i mod D)) mod Z) of disk (i mod D). For example, with Z=3 zones, and D=5 disks, the layout <disk, zone> is:

<0, 0> <1, 1> <2, 2> <3, 0> <4, 1>
<0, 1> <1, 2> <2, 0) <3, 1> <4, 2>
<0, 2> <1, 0> <2, 1> <3, 2> <4, 0>
<0, 0> <1, 1) <2, 2> <3, 0> <4, 1>
.
.
.

The S streams progress in order 0 to S−1 through disks 0 to (D−1), all streams accessing each disk from the same zone before moving through the disk in another zone. For a system having D=3 hard disks and Z=2 zones, a timeline <stream, disk, zone> would appear as follows, where time moves horizontally to the right, and streams move vertically downward:

<0, 0, 0>   <0, 1, 1>   <0, 2, 0>

<1, 0, 0>   <1, 1, 1>

<2, 0, 0>   <2, 1, 1>

<3, 0, 0>   <3, 1, 1>

<4, 0, 0>   <4, 1, 1>

The seek time for the first stream on a given disk could be over the entire disk, but with subsequent seeks for the pass being constrained to be within the same zone. Therefore:

total seek distance $\leq 1+(S-1)*(1-Z)$ and, total seek time $\leq S*\text{seek}((1+(S-1)*(1/Z))/S)$ $\leq S*\text{seek}((1+S/Z)/S)$ It follows then that:

average seek time $\leq \text{seek}((1+S/Z)/S)$ $\leq \text{seek}(1/S+1/Z)$

Thus, for Z=2 and large S, the average seek time approximates half the disk, a time that is worse than the disk's average case seek time but is better than the worst case value.

Ignoring the D−1 to 0 case, each stream will traverse each zone in order, and the average of the worse case bandwidth for each zone may be realized. Specifically, for each stream's pass over the set of D disks, at most a ceiling (D/Z) will be in the fastest zone, and similarly for other zones. By knowing the worst case bandwidth for each zone, a worst case value may be calculated over a traversal of the set of disks. This value will approximate the average case bandwidth for the disk.

The streams will be approximately uniformly distributed with respect to demand upon buffer system 230, at any time. At any given time, some streams will be at the beginning and an approximately equal number of streams will be at the end of entering or leaving the buffer system. At any given time, the average stream will be about 50% of the way through its buffer.

Because the streams access the disks in pipeline order without disk contention, a stream can delay issuing a next read until the data remaining in the play-out buffer is sent in the time it takes for a worst-case seek and transfer time. If buffer system 230 is implemented in segments (as was described optionally with respect to the first embodiment), the required memory per stream is approximately 50% of the buffer plus the reserve buffer.

However, become some transfers will come from the slow part of the hard disks, some additional elasticity is required in the buffering. In particular, up to two transfers in a row for each stream may be from the slowest part, due to the "seams" between sequential scales of the hard disks. Therefore, sufficient extra buffering must be reserved in each stream to handle this, with disk accesses commenced sufficiently early to maintain this reserve. Stated differently, in reading D disks, up to a ceiling of (D/Z) transfers may be from the high bandwidth area of the hard disks. This value may be used to bound the number of supported streams S.

Admission policy uses bandwidth and seek time calculations to determine a bound on the maximum number of streams that are guaranteed to be supported. There are S independent slots containing but one stream. However, a stream must wait until the hard disk and zone it requires matches the hard disk and zone it may access in the pipeline. The maximum wait will be S*Z slot intervals, where the slot interval is the time to consume or play-out one buffer.

Note that this second embodiment minimizes buffer memory usage, while increasing seek times, and thus possibly decreasing the number of supported active streams. By contrast, the first embodiment better optimizes disk seeks, but at the cost of additional memory consumption. For example, if the total number of streams U=150, the number of hard disk drives D=30, and block size is 256 KBytes, the first embodiment would require buffer system 230 to provide 50 MBytes of storage, whereas the second embodiment would only require about 20 MBytes storage.

Assuming once again that hard disk unit 90 is implemented using Hewlett Packard model C2240 hard disks having the same characteristics described with respect to calculations in Table 1 and Table 2, buffer access, seek time and number of supported users for the second embodiment may be calculated as follows: seek(1/2+1/S)+seek 11.2/2+ rotational latency time floor(D/2)/D*(5.8*11.2+fast zone transfer 2.5+5*1)+track switch ceiling (D/2)/D*(9.1*11.2)+ slow zone transfer 2.5+9*1)+track switching time.

Table 3 summarizes these results, showing buffer access time and percentage of the time the hard disks are busy, as a function of the number of streams S, and hard disks D. Table 3 demonstrates that N=(500 ms/112.1 ms), or N=4.5 streams can be served per such disks, using the second embodiment of the present invention.

TABLE 3

| S | D | Access Time (ms) | Disk Busy (%) |
|---|---|---|---|
| 50 | 30 | 112.3 | 37.4 |
| 50 | 25 | 113.1 | 45.2 |
| 50 | 20 | 112.3 | 56.1 |
| 50 | 15 | 113.6 | 75.8 |
| 50 | 10 | 112.3 | 112.3 |
| 75 | 30 | 112.1 | 56.1 |
| 75 | 25 | 113.0 | 67.8 |
| 75 | 20 | 112.1 | 84.1 |
| 75 | 15 | 113.5 | 113.5 |
| 100 | 30 | 112.1 | 74.7 |
| 100 | 25 | 112.9 | 90.3 |
| 100 | 20 | 112.1 | 112.1 |
| 125 | 30 | 112.1 | 93.4 |
| 125 | 25 | 112.9 | 112.9 |
| 150 | 30 | 112.0 | 112.0 |
| 175 | 30 | 112.0 | 130.7 |

If it is now assumed that the hard disks rotate at 7200 RPM, as in the latest generation of hard disk drives, with all other characteristics remaining identical, the results are as shown in Table 4.

TABLE 4

| S | D | Access Time (ms) | Disk Busy (%) |
|---|---|---|---|
| 50 | 30 | 86.8 | 28.9 |
| 50 | 25 | 87.4 | 35.0 |
| 50 | 20 | 86.8 | 43.4 |
| 50 | 15 | 87.8 | 58.6 |
| 50 | 10 | 86.8 | 86.8 |
| 50 | 5 | 89.9 | 179.7 |
| 75 | 30 | 86.7 | 43.4 |
| 75 | 25 | 87.3 | 52.4 |
| 75 | 20 | 86.7 | 65.0 |
| 75 | 15 | 87.7 | 87.7 |
| 75 | 10 | 86.7 | 130.1 |
| 100 | 30 | 86.6 | 57.8 |
| 100 | 25 | 87.3 | 69.8 |
| 100 | 20 | 86.6 | 86.6 |
| 100 | 15 | 87.7 | 116.9 |
| 125 | 30 | 86.6 | 72.2 |
| 125 | 25 | 87.2 | 87.2 |
| 125 | 20 | 86.6 | 108.3 |

TABLE 4-continued

| S | D | Access Time (ms) | Disk Busy (%) |
|---|---|---|---|
| 150 | 30 | 86.6 | 86.6 |
| 150 | 25 | 87.2 | 104.6 |
| 175 | 30 | 86.6 | 101.0 |

It is apparent from the above that N=(500 ms/86.6 ms), or N=5.8 streams may be served per disk, according to the present invention.

Assume now a scenario representative of another prior art solution with average case seek time (e.g., due to disk sorting) and worst case bandwidth disk transfer (e.g., no bandwidth management). Buffer access time would be 10.5+ seek time 11.2/2+rotational latency (9.1*11.2+slow zone transfer 2.5+9*1)+track switching time=130 ms, or about 3.8 ms/disk. For 7200 RPM disks, a buffer access time of 98.8 ms is realized, or about 5.1 streams per disk. It is seen that the first embodiment of the present invention provides a 20% improvement, and the second embodiment a 14% improvement over such prior art solutions using such hard disk drives.

It will be appreciated that the first described embodiment of the present invention can allow use of any excess fractional hard disk capability, at the cost of some additional buffer storage. For example, if each hard disk could support 4.5 streams per disk per time period, a prior art server would be limited to 4 streams per disk. That is, such servers could not make use of the excess 0.5 streams per disk of capacity.

However, using a "work-ahead" technique developed by applicants, servers according to the present invention can use such excess bandwidth to serve additional clients.

According to applicants' work-ahead technique, when hard disk accesses for one slot in one time period have been completed, the hard disk is made available to begin work early for the next slot to access the disk. The admission arbitrator subsystem 110 ensures that the full system load does not equal or exceed the total capacity of the hard disk subsystem 90. As a result, a long-term rate mismatch exists such that, over time, hard disk subsystem 90 can always supply more data than needed. The work-ahead technique exploits this mismatch, such that in steady-state, the video system is approximately one full time period ahead of where it needs to be to supply the client users. Stated differently, the work-ahead embodiment builds up "slack time" in the disk schedule unit 200 (see FIG. 1).

Using work-ahead strategy, admission arbitrator 110 can deliberately create short-term overloads, for example by putting too much streams in one slot, providing the long term load is maintained below the hard disk capacity. This method can minimize the time a new client must wait to receive the stream data. In addition, the slack can be exploited to maximize the number of clients overall.

For example, if the disk capacity is such that a disk can serve 4.5 clients each time period, the admission arbitrator can alternate slots with four streams and slots with five streams. Although the slots with five streams cannot read the disk in one time period, each pair of slots completes within two time periods. Because of the work-ahead created slack, the clients view movies and/or hear audio without awareness of any disruption in service.

Work-ahead also gives the server 20 a level of immunity from non-determinism in the hard disk subsystem 90. Typical disruptions such as sector retries, bad block forwarding, etc., will delay a disk transfer from 20 ms to 100 ms, and delays introduced by thermal recalibration typically range from 50 ms to 300 ms. Disks specifically designed for media servers generally have thermal recalibration times at the low end of the range. By setting the fundamental time period of the server to 0.5 second (500 ms), the server can absorb substantial disruptions without affecting the client streams by consuming the built-up slack. As long as the disruptions do not persist (as in a failing disk), server will quickly rebuild its slack and suffer no service disruption.

The work-ahead feature can be constrained to only allow accesses from one future time period, because each step of work ahead allowed can increase the start-up time for new streams. In addition, each step of work-ahead creates a requirement for more memory buffers to hold the accessed data until it is needed.

Although the preferred embodiments have been described with respect to storage and transmission of video information, the present invention may also be used where the information is audio, or a combination of audio and video.

Modifications and variations may be made to the disclosed embodiments without departing from the subject and spirit of the invention as defined by the following claims.

What is claimed is:

1. A method for achieving substantially average case hard disk drive transfer bandwidth in a video server system having a plurality of D hard disk drives whereon blocks of video movies are stored before transfer to a buffer unit, the method comprising the following steps:

(a) dividing each of said hard disk drives into Z substantially equal storage zones;

(b) recording a portion of each of said video movies across all of said storage zones such that each of said storage zones contains a substantially equal number of blocks of a video movie; and (c) for said video server system, defining a substantially equal number of user streams per a slot using each of said zones, wherein a sum S of said user streams represents a maximum number of users that can access said video server system at one time;

wherein worst case bandwidth for each slot is determinable given worst case bandwidth information for transfers from each said zone.

2. The method of claim 1, wherein step (b) further includes recording each of said video movies across all of said D hard disk drives such that each of said D hard disk drives contains a substantially equal number of blocks of a video movie.

3. The method of claim 1, wherein at step (b), for each of said video movies, movie block i is recorded on hard disk drive (i mod D).

4. The method of claim 1, wherein at step (b), for each of said video movies, movie block i is recorded in zone ((i/D) mod Z) of hard disk drive (i mod D).

5. The method of claim 1, wherein at step (c), said user streams are organized into said slots such that each slot contains substantially N=S/D streams.

6. The method of claim 1, wherein said method also achieves substantially an average case hard disk drive seek time, said method including the following additional step:

(d) seeking information from said D hard disk drives by seeking to a nearest end of a set of N ordered seeks, and then proceeding through said set to a nearest subsequent position;

wherein substantially average case hard disk drive transfer seek time is achieved.

7. The method of claim 6, wherein total seek time for a set of N access is $\leq N*seek(1.5/N)$.

8. The method of claim 1, wherein at step (a), Z=2.

9. The method of claim 1, wherein said video server system buffer unit includes a set of buffers providing at least two buffers per stream, wherein at any time interval one of said buffers receives blocks from said hard disk drives while a second of said buffers provides blocks to said users, which provided blocks were received during an immediately preceding time interval.

10. The method of claim 9, wherein said set of buffers each store about 256 Kbytes and transfer a block of 256 Kbytes in about 500 ms.

11. The method of claim 1, wherein at least 6 streams/hard disk drive are accommodated by said video server system.

12. The method of claim 1, wherein said video server system provides at least two of said video movies asynchronously to at least two users over a network.

13. The method of claim 1, wherein at step (b), for each of said video movies, movie block i is recorded on hard disk drive zone (((i/D)+(i mod D)) mod Z) of hard disk drive (i mod D).

14. The method of claim 13, wherein:
   at step (c), said user streams are organized into said slots such that each slot contains substantially N=S/D streams; and
   data for streams in said slots are stored in order in said buffer unit, and are read into and played out of said buffer unit in order.

15. A method for achieving substantially average case hard disk drive transfer bandwidth and substantially average case hard disk drive seek time in a video server system having a plurality of D hard disk drives whereon blocks of video movies are stored before transfer to a buffer unit and play-out to a plurality of users over a network, the method comprising the following steps:
   (a) dividing each of said hard disk drives into Z substantially equal storage zones;
   (b) recording, for each of said video movies, movie block i on hard disk drive (i mod D), and in zone ((i/D) mod Z) of hard disk drive (i mod D);
   (c) for said video server system, defining substantially N=S/D user streams/slot using each of said zones, wherein a sum S of said user streams represents a maximum number of users that can access said video server system at one time without substantial degradation of video server system performance;
      wherein worst case bandwidth for each slot is determinable given worst case bandwidth information for transfers from each said zone; and
   (d) seeking information from said D hard disk drives by seeking to a nearest end of a set of N ordered seeks, and then proceeding through said set to a nearest subsequent position;
      wherein substantially average case hard disk drive transfer seek time is achieved.

16. The method of claim 15, wherein at step (a), Z=2, and wherein said video server system buffer unit includes a set of buffers providing at least two buffers per stream, wherein at any time interval one of said buffers receives blocks from said hard disk drives while a second of said buffers provides blocks to said users, which provided blocks were received during an immediately preceding time interval.

17. A disk layout unit for use with a video server that stores video movies before they are output to a buffer on a plurality of D hard disk drives that are each divisible into Z substantially equal storage zones, each of said video movies being divisible into i blocks, the disk layout unit including:

a mechanism causing each a portion of said video movies to be recorded across all of said storage zones such that each of said storage zones such that each of said storage zones contains a substantially equal number of blocks of a video movie;
wherein a substantially equal number of user streams is defined per a slot using each of said zones, wherein a sum S of said user streams represents a maximum number of users that can access said video server system at one time;
   wherein worst case bandwidth for each slot is determinable given worst case bandwidth information for transfers from each said zone; and
   wherein substantially average case hard disk drive transfer seek time is achieved.

18. The disk layout unit of claim 17, wherein said mechanism causes each of said video movies to be recorded across all of said D hard disk drives such that each of said D hard disk drives contains a substantially equal number of blocks of a video movie.

19. The disk layout unit of claim 17, wherein said mechanism causes movie block i for each of said movie videos to be recorded on hard disk drive (i mod D).

20. The disk layout unit of claim 17, wherein said mechanism causes movie block i for each of said movie videos to be recorded in zone ((i/D) mod Z) of hard disk drive (i mod D).

21. The disk layout unit of claim 17, wherein each of said user streams is organized into said slots such that each slot contains substantially N=S/D streams.

22. A system for achieving substantially average case hard disk drive transfer bandwidth in a video server system having a plurality of D hard disk drives, each divisible into Z substantially equal storage zones, whereon blocks of video movies are stored before transfer to a buffer unit, the system comprising:
   a disk layout unit causing a portion of each of said video movies to be recorded across all of said storage zones such that each of said storage zones contains a substantially equal number of blocks of a video movie; and
   an admission mechanism that defines a substantially equal number of user streams per a slot using each of said zones, wherein a sum S of said user streams represents a maximum number of users that can access said video server system at one time;
      wherein worst case bandwidth for each slot is determinable given worst case bandwidth information for transfers from each said zone.

23. The system of claim 22, wherein said disk layout unit causes each of said video movies to be recorded across all of said D hard disk drives such that each of said D hard disk drives contains a substantially equal number of blocks of a video movie.

24. The system of claim 22, wherein said disk layout unit causes movie block i for each of said movie videos to be recorded in a format selected from the group consisting of (i) recording on hard disk drive (i mod D), and (ii) recording on in zone ((i/D) mod Z) of hard disk drive (i mod D).

25. The system of claim 22, wherein said admission unit organizes said user streams into said slots such that each slot contains substantially N=S/D streams.

26. The system of claim 22, wherein said system further includes a buffer unit coupled to an output of said D hard disk drives, and wherein
   said slots are stored in order in said buffer unit, and are read into and played out of said buffer unit in order.

27. The system of claim 22, wherein:

information is sought from said D hard disk drives by seeking to a nearest end of a set of N ordered seeks, and then proceeding through said set to a nearest subsequent position; and said system achieves substantially average case hard disk drive seek time.

* * * * *

UNITED STATES PATENT AND TRADEMARK OFFICE
CERTIFICATE OF CORRECTION

PATENT NO. : 5,852,705
DATED : December 22, 1998
INVENTOR(S) : HANKO, et al.

It is certified that error appears in the above-indentified patent and that said Letters Patent is hereby corrected as shown below:

In Claim 17, column 16, line 1, delete "each" and insert after "a portion of" --each of--; lines 3 and 4, delete "such that each of said storage zones"; and line 7, after "defined per" delete "a".

In Claim 22, column 16, line 43, after "streams per" delete "a".

In Claim 24, column 16, line 58, after recording, both instances, delete "on"

Signed and Sealed this

Fourth Day of May, 1999

Attest:

Q. TODD DICKINSON

Attesting Officer

Acting Commissioner of Patents and Trademarks